United States Patent [19]

Eaton

[11] Patent Number: 4,918,817
[45] Date of Patent: Apr. 24, 1990

[54] ARTICLE POSITIONING APPARATUS

[76] Inventor: Homer L. Eaton, 652 Neptune Ave., Leucadia, Calif. 92204

[21] Appl. No.: 293,821

[22] Filed: Jan. 5, 1989

Related U.S. Application Data

[63] Continuation-in-part of Ser. No. 101,420, Sep. 28, 1987, abandoned.

[51] Int. Cl.⁵ .............................................. G01B 5/24
[52] U.S. Cl. .................................. 33/1 M; 346/139 B
[58] Field of Search ................. 33/1 M, 1 MP, 1 PT, 33/763, 529, 35, 36, 32.3; 346/139 R, 139 B, 29, 134

[56] References Cited

U.S. PATENT DOCUMENTS

| | | | |
|---|---|---|---|
| 3,561,125 | 2/1971 | Zeidler | 33/1 M X |
| 3,564,533 | 2/1971 | Linn | 33/1 M X |
| 3,832,781 | 9/1974 | Flagge | 33/1 M X |
| 4,412,383 | 11/1983 | Landa | 33/1 M |
| 4,583,292 | 4/1986 | Langberg | 33/1 M |
| 4,704,798 | 11/1987 | Hird | 33/1 PT X |

Primary Examiner—Harry N. Haroian
Attorney, Agent, or Firm—Fulwider, Patton, Lee & Utecht

[57] ABSTRACT

An article positioning apparatus for locating an article or transporter at predetermined X, Y plot coordinates through the use of tapes characterized by sufficient stiffness to resist bending under compressive loads, whereby the tape can be used not only to pull but also to push the transporter into position in conjunction with other positioners. A version of the apparatus utilizes the tape drive to also establish a support associated with the transporter at predetermined X, Y and Z coordinates.

11 Claims, 3 Drawing Sheets

ARTICLE POSITIONING APPARATUS

CROSS REFERENCE TO RELATED APPLICATION

This application is a continuation-in-part of my co-pending patent application Ser. No. 101,420, filed Sept. 28, 1987 now abandoned.p The present application discloses further embodiments of article position apparatus.

BACKGROUND OF THE INVENTION

1. Field of the Invention

The present invention relates to apparatus for positioning an article on a work surface at predetermined X, Y plot coordinates, or dynamically at a continuous succession of such coordinates, and more particularly to an article positioning apparatus having one or more positioners coupled to an article by a tape or tapes sufficiently longitudinally rigid that the article can be positioned by extending or retracting the tape.

2. Description of the Related Art

There are various applications in which it would be advantageous to be able to precisely locate an article at predetermined X, Y plot coordinates, and to do this dynamically so as to continuously trace a pattern upon a work surface.

In the sign making trade large signs could be made in this way. At present the letters of such signs are traced on sign material using large templates to establish the X, Y coordinates for the marking instrument or stylus. Sometimes a pantograph arrangement is used to trace the large letters from a smaller pattern, or an optical projection system is used to project the large letters from a smaller pattern.

Precise location of a stylus or the like is also important in making drawings. Heretofore, positioners in the form of X-Y plotters have been used for this purpose. Such a plotter typically employs a carriage movable along the X axis, and mounting a stylus movable along the Y axis. Another form of plotter utilizes a telescoping arm movable in and out and rotatable in an arc about its pivot to place the marking stylus at the desired X, Y plot coordinates. The size and weight of the components of such plotters introduces an inertia which adversely affects sensitive response to actuating forces. Moreover, the larger the image to be drawn, the larger must be components, such as the lead screws to move the carriage and stylus, or the telescoping arm.

A cable driven form of plotter designed to reduce the undesirable inertia of the foregoing plotter types is described in U.S. Pat. No. 4,412,383, issued to Landa and entitled "Cable Driven Plotter". A pair of cables coupled to a stylus are movable in and out from reels which are pivotally carried at one edge of a plotting board. The extent of cable movement is controlled to locate the stylus at the desired X, Y coordinates. A carriage freely movable along the opposite edge of the plotting board is connected by a third cable to the stylus. The latter cable is spring biased to place the other pair of cables under tension. This takes up slack and promotes greater precision of movement. Another form of cable driven plotter is disclosed in U.S. Pat. No. 4,583,292, entitled "Low Inertia X-Y Cable Drive". The plotter employs four flexible cables attached to a stylus. Each cable is changed in length by a separate digital servo drive motor which responds to signals from a control means comprising an external computer and microprocessor. The control signals correspond to desired plot coordinates X, Y stored in the control means. Sensors associated with the cable pulleys provide cable length feedback signals which are input to the computer. This plotter, according to Langberg, is fundamentally different from the Landasystem in that "the cables must be under at least minimum tension so that the marker housing is suspended above the plotting medium and there is no slack in cables when the motion is started again". Also, Langberg provides a system of force sensors to monitor the tension of all cables, and provide corresponding feedback signals to the servo control system.

SUMMARY OF THE INVENTION

The present invention provides a plotter or article positioner which positions an article such as a stylus by a tape system in which the tape is characterized by a stiffness sufficient to resist bending under compressive loads applied along its longitudinal axis, and yet the tape is also capable of bending to permit winding upon itself.

Four such positioners are utilized in one embodiment to position a stylus at a succession of predetermined X,Y plot coordinates and thereby trace the letters of a sign. This is done without any need for developing tension in the tapes sufficient to support the stylus above the work surface.

The relative stiffness or rigidity of the positioner tapes tends to stabilize the system, eliminating undesirable slack between the tape drive components and enabling the positioners to pull upon and, if desired, to also push against the stylus to position it. The push-pull capability of the positioner increases the effective working area of the system. For example, if a pull tape or cable system were used in a rectangular working area having positioners at the four corners, certain portions of the area would be geometrically insensitive, and relatively large positioning errors would occur. For example, if the article to be positioned were to be located adjacent the near edge of a horizontally oriented working area, the two near positioners would have to accomplish the task by pulling through angles approaching zero relative to the near edge of the working area. Because of poor positioning sensitivity at such angles, the effective working area would have to be reduced to a more centrally located region.

The longitudinal stiffness of the tape is particularly useful in a second embodiment of the invention in which the article to be positioned includes a support which must be vertically projected to a predetermined height or Z coordinate. At some point in the positioning procedure the article is constrained against movement so that actuation of the tape drive means upwardly projects the support to the desired Z coordinate.

More particularly, in the first embodiment the four positioners are coupled to a transporter which mounts a stylus which is to be positioned at a succession of predetermined X, Y plot coordinates on a work surface. Each positioner is small enough to be portable and includes a work platform adapted to be detachably fixed to the structure defining the work surface.

Each positioner is responsive to control means operative to generate signals corresponding to the desired X, Y plot coordinates. A mounting body of the positioner is freely pivotable for rotation in an arc about an axis perpendicular to the work surface so that the body can orient its tape in response to the tape movements of the other positioners. Each tape extends from the transporter between a pair of pinch rollers and is wound upon a tape spool carried by the mounting body. Rotation of the pinch rollers by a drive motor projects the tape outwardly or inwardly to push or pull the article, respectively.

The drive motor is responsive to signals from the control means to operate the pinch rollers as required. Tape drive sensor means cooperate with the motor drive shaft to provide feedback signals corresponding to drive shaft angular movement, and the control means compares this feedback information with stored information respecting the desired X, Y coordinates.

Preferably, indicia means on the tape also provide feedback information to correct for any slippage in the tape feed system not sensed by the tape drive sensor means. The tape indicia can be distance markings on the tape or punched holes, or both.

In a second embodiment of the invention, each positioner is mechanically independent of any other positioner. Each positioner includes a mechanism for clamping it to the transporter. The transporter includes a support which can be raised by the tape when the transporter is clamped. This locates the support at any predetermined height or Z coordinate.

The clamping means are releasable so that when the mounting body of the positioner has been rotated in azimuth, that is, in an arc about its vertical axis to establish a desired azimuth position, operation of the pinch rollers can extend the tape and push the transporter out to the proper X, Y coordinates.

Other features and advantages of the invention will become apparent from the following detailed description, taken in conjunction with the accompanying drawings, which illustrate by way of example the features of the invention.

BRIEF DESCRIPTION OF THE DRAWINGS

FIG. 3 is an enlarged view taken along the line 3—3 of FIG. 1;

DESCRIPTION OF THE PREFERRED EMBODIMENTS

As shown in the drawings for purposes of illustration, the invention is embodied in an article positioning apparatus adapted to move a stylus over a work surface to trace the letters of a sign. It will be obvious that the apparatus is useful in a variety of other applications, including the tracing of drawings in a mechanical drafting application.

As will be seen, the location of the transporter carrying the stylus is controlled by signals derived from information stored in a control means which is part of a servo system. Many of the details of the servo drive and control means are not presented inasmuch as the design of suitable components for this purpose are so well established in connection with X-Y plotters. For example, reference is made to previously mentioned U.S. Pat. No. 4,583,292, for an example of one type of control system, although in that case a cable drive and different forms of transporter and positioner were involved. The patent refers to a suitable control means as including a central microprocessor connected by a communication controller to a bus for receiving input data in the form of plotter commands from an external computer. Input data are translated by the microprocessor using a program stored in the system into signals to the drive motors corresponding to the desired individual X, Y plot coordinates. Sensors or encoders associated with the drive means provide feedback signals for use by the control means in comparing the actual transporter position with the desired position stored in the control program. A suitable program can be established using standard trigonometric calculations in the form of an algorithm. Under such a system each of the four drive motors responds to signals from the control means to reel in or pay out its tape in a manner coordinated with all of the other drive motors to continuously move the transporter to a succession of X, Y coordinates, and continuously trace the letters of the desired sign.

As will be apparent, the control means will also include means for generating various other control signals, such as may be necessary to operate solenoids for specialized functions, as will be seen.

The phrase "article positioning apparatus" is intended to also comprehend that type of apparatus known as a graphic digitizer. In effect, a digitizer performs a function opposite to that of a plotter. A plotter uses information to create a graphic image, while a digitizer obtains information from a graphic image which can be later used for other purposes. Thus, the transporter of the present invention could be traced over a graphic image to store signals corresponding to such movement. A typical graphic digitizer is shown, for example, in U.S. Pat. No. 3,564,533 issued to P. D. Linn.

Referring now to the drawings, and particularly to FIGS. 1-10, the article positioning apparatus in the embodiment illustrated comprises four positioners 10 which are each coupled by an elongated tape 12 to an article or transporter 14 for movement of the transporter 14 over a table having a plotting or work surface 16 in the form of a sheet of paper or other sign material.

Figure 1:
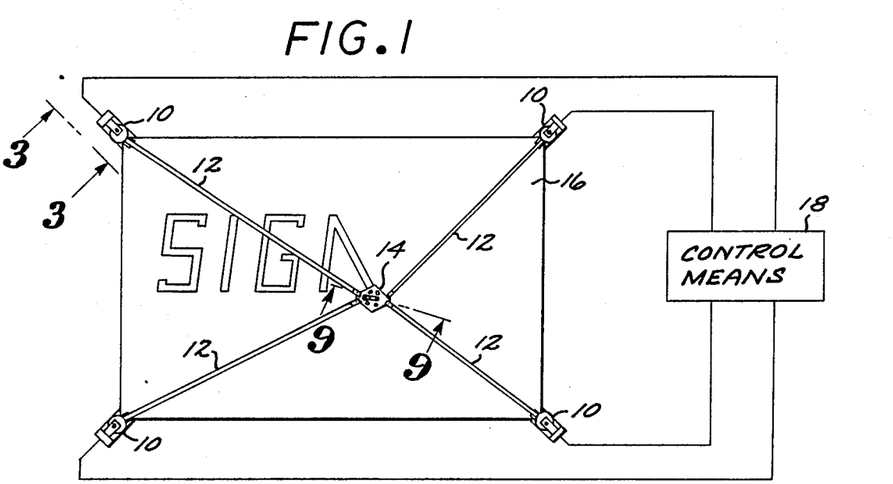
FIG. 1 is a diagrammatic plan view of the article positioning apparatus, and in which the article is a transporter which carries a marking instrument or stylus.
Figures 2, 4:
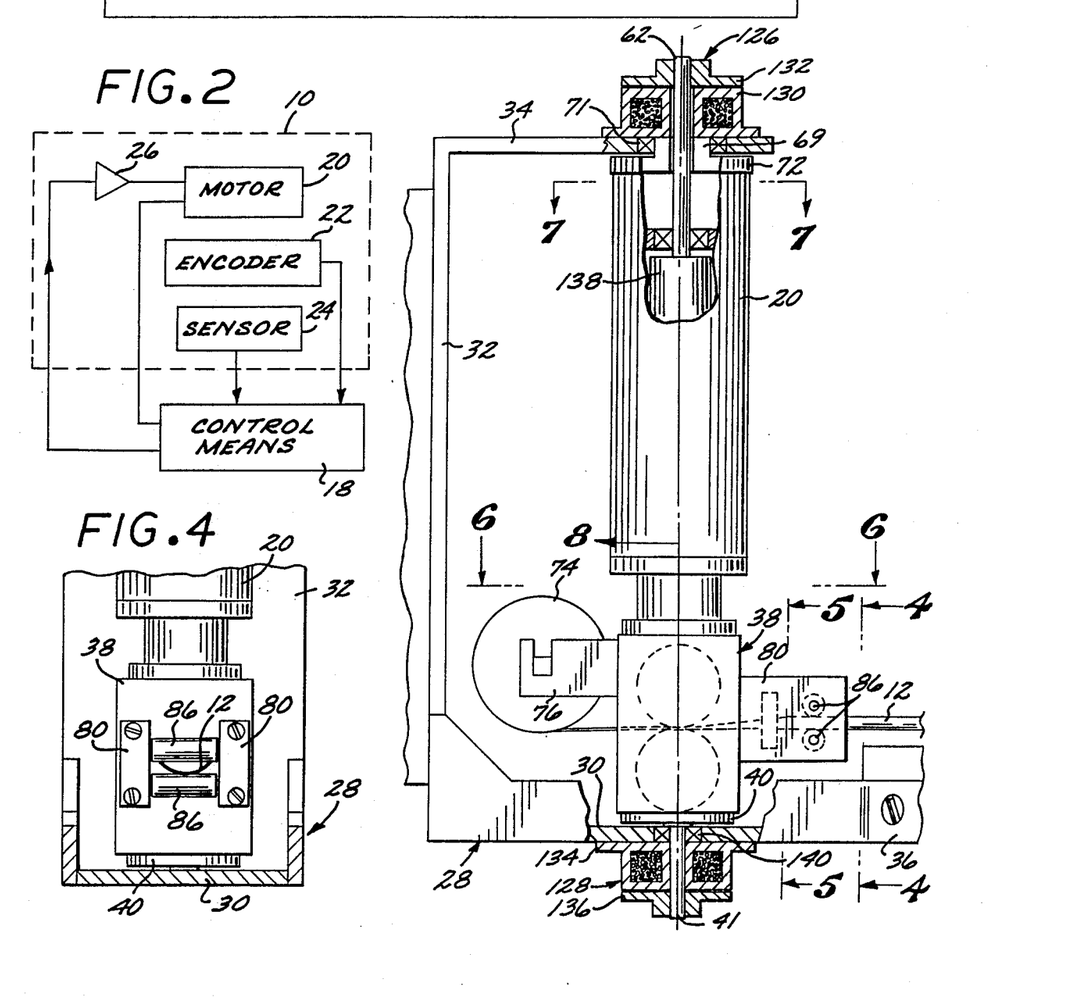
FIG. 2 is a diagrammatic view of the control means and the manner of its connection to the drive means and to the position feedback means for each positioner.
FIG. 4 is a partial view taken along the line 4—4 of FIG. 3.

The positioners 10 are identical in construction and are responsive to a control means 18. The control means is operative to generate control signals corresponding to desired X, Y plot coordinates for the transporter 14, and it is responsive to feedback signals indicative of the actual position of the transporter. The control means 18 is part of a typical servo system and, as seen in FIG. 2, is electrically interconnected to various components of each positioner 10 in order to apply control signals and receive feedback signals.

The positioner components include a motor 20, an encoder 22 and a sensor means 24. The motor accepts signals from the control means 18 through an amplifier 26. The particular construction of these components forms no part of the invention inasmuch as they are commercially available. Thus, the motor 20 is preferably a permanent magnet DC servo motor having an integral tachometer, with the encoder 22 also being integral for closed-loop control of the system. A satisfactory encoder 22 is of that type which provides a series of pulses or counts proportional in number to the change in angular position of the motor shaft relative to its stator. The pulses have a positive or negative polarity, depending upon the direction of shaft rotation.

As will be seen, the encoder count provides an indication of the extent of movement of the tape 12. A feedback signal representative of actual tape movement is also provided by the sensor 24. In the present embodiment the sensor 24 comprises a pair of optical switches having a gallium arsenide infrared emitting diode and a silicon darlington phototransistor. It is commercially available. The amplifier 26 is also commercially available, preferably taking the form of a pulse-width-modulated amplifier for high performance DC servo systems.

As best seen in FIGS. 3-8, each positioner 10 includes a work platform 28 having a generally rectangular base 30, a vertical plate 32 attached to the base, and a horizontal top plate attached to the plate 32. The work platform also includes side straps having elongated projecting portions 36 on either side for removably attaching the positioner 10 to the corner edges of the work surface table.

Each positioner 10 also includes a mounting body 38 suitably secured at its base to a bottom pivot plate 40 having a depending axle stub 41 which rotatably fits within a complemental opening i the platform base 30. This arrangement allows the mounting body 38 to freely pivot relative to the clamped or fixed work platform 38.

Figures 5, 6, 7, 8, 9, 10:
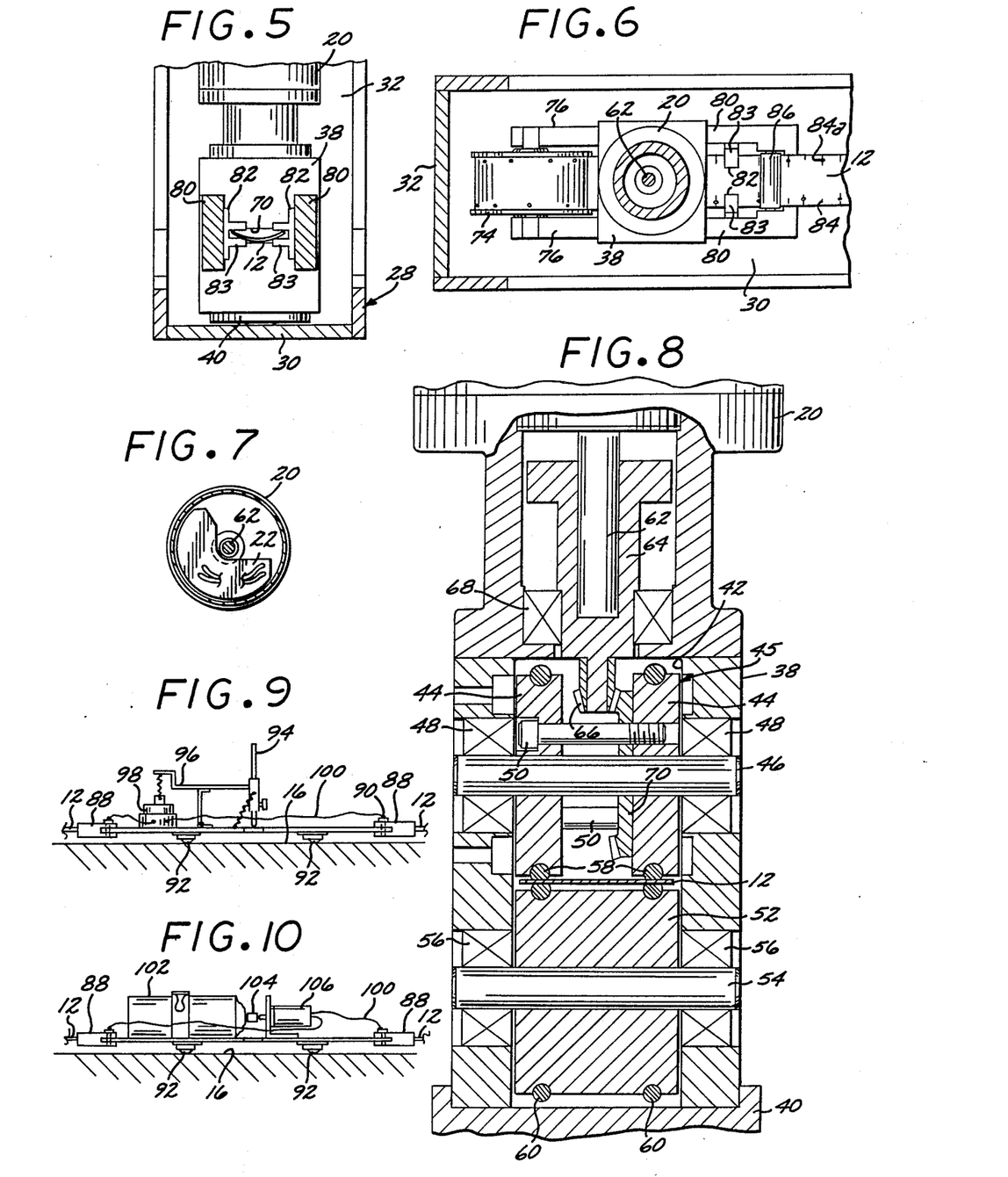
FIG. 5 is a partial view taken along the line 5—5 of FIG. 3.
FIG. 6 is a partial view taken along the line 6—6 of FIG. 3.
FIG. 7 is a view taken along the line 7—7 of FIG. 3.
FIG. 8 is a partial view taken along the line 8—8 of FIG. 3.
FIG. 9 is a side elevational view of the transporter.
FIG. 10 is a side elevational view of a second form of transporter which mounts a solenoid actuated spray paint can.

The mounting body 38 includes a vertically oriented cylindrical bore 42, as seen in FIG. 8. A pair of drive or pinch wheels 44, which together comprise an upper pinch roller 45, are arranged in confronting relation within the bore 42 for rotation about a horizontal axis defined by a shaft 46. The shaft 46 is disposed within suitable end bearings 48 carried in openings provided in the sides of the mounting body 38. The pinch wheels 44 are connected for common rotation by means of a plurality of machine screws, two of which are illustrated at 50 in FIG. 8.

A second pinch roller 52 is located below the pinch roller 45 for rotation about a horizontal axis defined by a shaft 54 rotatable within end bearings 56. The bearings 56 are located in suitable openings provided in the side walls of the body 38.

The two drive wheels 44 are provided with peripheral grooves to accommodate, respectively, a pair of resilient O-rings 58. Complemental grooves and O-rings 60 are provided in the lower pinch roller 52. The tape 12 passes between the pinch rollers, with the O-rings 58 and 60 squeezing against the tape 12 to move the tape longitudinally when the pinch rollers are rotated.

The pinch rollers are rotated by a drive shaft 62 of the motor 20. The shaft 62 is fixed within a vertically oriented shaft extension 64 which fixedly mounts a bevel pinion 66 at its lower extremity. The lower extremity of the shaft extension is supported by a bearing 68 for rotation about a vertical axis.

The frame of the motor 20 which fixedly carries the motor stator is fixed at its base to the upper surface of the mounting body 38. The upper extremity 72 of the motor frame is reduced in diameter to define a base 69 freely rotatable in a pivot bearing 71 carried by the work platform top plate 34.

The pinion 66 fixed to the motor shaft meshes with a bevel gear 70 suitably affixed to the inner face of one of the drive wheels 44 so that rotation of the motor shaft rotates the pinch rollers.

The position of the integral encoder 22 adjacent the motor drive shaft is best illustrated in FIG. 7.

With the foregoing arrangement, the drive assembly comprising the mounting body 38 and the motor 20 is freely pivotable about a vertical axis to an azimuth position or angular orientation dictated by the azimuth position in which the tape 12 is located in response to the position of the transporter 14 which is imparted by the action of the other positioners 10.

As will be seen later in a second embodiment of the invention the drive assembly can be selectively constrained against free rotation or pivotal movement to suit the invention to a system involving establishment of a Z coordinate in addition to establishment of X and Y coordinates.

On rotation of the motor shaft, the consequent rotation of the pinch rollers 45 and 52 pulls the tape 12 off a tape spool 74. The spool 74 is supported for rotation about a horizontal axis by a pair of reel or spool supports 76 which are attached to the rear of the mounting body 38.

The tape 12 is characterized by longitudinal rigidity or stiffness. Although such stiffness could be achieved in various ways, the tape is preferably made of metal and has an arcuate or upwardly concave configuration. It also is made sufficiently thin that it can be wrapped upon itself upon the tape spool 74 in a compact manner, much like the well known reel wound carpenter's tape.

As the tape is drawn off the spool 74, it has a relatively flat configuration during its passage between the O-rings of the pinch rollers. Beyond the pinch rollers the tape assumes its normal concave configuration, enabling the tape 12 to resist buckling or bending under compressive loads applied along its longitudinal axis when the tape is used to push the transporter 14. Of course, its capacity to resist is limited, but the degree of stiffness is made sufficient to accomplish the necessary positioning of the transporter, as will be apparent. The stiffness of the tape can be used to push the transporter 14 in combination with a pulling of the transporter by oppositely located positioners 10. This enables the transporter to be located precisely throughout a working surface 16 extending substantially to the edges of the table to which the positioners 10 are attached. Further, the characteristic stiffness of the tape is important to the operation of the second embodiment of the invention, as will be seen.

As the tape 12 leaves the pinch rollers it passes through a suitable aperture 70 in the front of the mounting body 38, as seen in FIG. 5. It next passes between a pair of horizontally spaced apart, vertically disposed plates or sensor guides 80 attached to the front of the mounting body 38. The guides 80 fixedly mount a pair of confronting sensor holders 82 which each define a horizontal channel. The edges of the tape pass through these channels, where surfaces include the optical sensors 24.

Tape 12 includes tape indicia 84 and 84a. Indicia 84 are preferably the usual distance markings common on a measuring tape, while indicia 84a are holes punched adjacent the tape edges. Either or both such indicia may be sensed by the sensors 24 to provide appropriate feedback signals representing the amount of extension or retraction of the tapes. At high tape speeds the punched indicia 84a are more effective, while at slow tape speeds the distance markings 84 more precisely indicate tape travel.

The sensor guides 80 rotatably mount a pair of vertically arranged guide rollers 86 which engage the upper and lower portions of the tape to precisely fix its vertical position, as seen in FIGS. 4 and 6.

The tape extending from each positioner 10 is connected to the generally rectangular transporter 14, the tapes of two positioners preferably being connected adjacent one another at one corner of the transporter, while the other pair of tapes is connected adjacent one another at the opposite transporter corner. Each tape connection is by means of a clevis 88, as seen in FIG. 9. The clevis is preferably made in two parts (not shown) having complemental arcuate inner surfaces which closely clamp the tape between them upon tightening of fastener means 90.

Fastener means 90 includes a vertical shaft or bolt having a rotatable, close tolerance fit within a suitable opening in the transporter so that the transporter and tape end are freely rotatable relative to one another about the vertical axis defined by the bolt of the fastener means.

As best seen in FIG. 9, the transporter includes a plurality of freely rotatable balls 92 which allow the transporter to roll freely over the work surface 16. The transporter supports a marking instrument or stylus 94 which is normally biased into engagement with the sign material on the work surface 16.

The stylus 94 is carried by a support which is pivotally mounted to the upper surface of the transporter, the support being pivotable to raise the stylus out of engagement with the sign material upon energization of a solenoid 98 attached to the transporter. The solenoid is actuated by the control means 18 through an electrical path which includes an electrical conductor 100, the tape clevis, and the metal tape 12. Use of the tape as part of the electrical path eliminates any need for usual conductors dragging over the work surface.

Another version of the transporter is illustrated in FIG. 10, the primary difference being that a paint spray can 102 is carried by the transporter. Its nozzle 104 is actuable by an adjacent solenoid 106 to direct paint spray through the aperture of the nozzle, which is downwardly directed for spraying through an aligned aperture in the transporter.

In operation, actuating signals from the control means 18 to the individual positioners effects extension or retraction of the respective tapes 12 to orient the transporter 14 at a succession of predetermined X, Y coordinates to trace the sign letters. Each positioner motor extends or retracts the tape according to the polarity of the control signal. The feedback signals provided by the encoder, together with any corrective feedback signal from the sensor 24, continuously orient the transporter in a manner coordinated with that of the other positioners.

The use of a tape drive for the transporter provides a capability for both pulling and pushing the transporter into position, thereby providing a relatively rigid interconnection of the tape and transporter components without resort to the rigid arms and carriages of the prior art. The longitudinally stiff tape can be wound upon itself for compact storage. It also provides a convenient carrier for indicia operative to give a precise indication of changes in tape length, regardless of any slippage which may occur at the pinch rollers.

The characteristic longitudinal stiffness of the tape is also suited to use in the apparatus of the embodiment illustrated in FIGS. 11-15. This embodiment is useful in connection with the inspection of precision bent tubing such as exhaust pipes or small diameter fuel lines.

Support of the tubing during measurement is typically done by means of a vector tube measuring machine. Such a machine is commercially available, not part of the invention, and therefore only generally described. It includes an inspection arm which is placed adjacent various sections of the tubing to determine its X, Y and Z coordinates for computer comparison with predetermined stored inspection coordinates. Agreement establishes that the tubing is of the proper configuration.

Heretofore the tubing was supported by clamps or other supports whose location and height were not readily repeatable. Unwanted tube deflections occurred by reason of clamping forces or by reason of gravity loads. Assuming the X, Y and Z coordinates can be calculated for the points where the tubing can be supported with zero tubing deflection under gravity loads, the tubing can simply be rested upon supports located at such coordinates.

The second embodiment of the invention is adapted to respond to a control means analogous to the control means 18 to locate supports of a plurality of transporters at X, Y and Z coordinates stored in a suitable computer program associated with the control means. The control means utilizes usual trigonometric calculations to generate signals for moving the transporter supports to the X, Y and Z coordinates which correspond to the predetermined zero deflection points.

Figure 12:
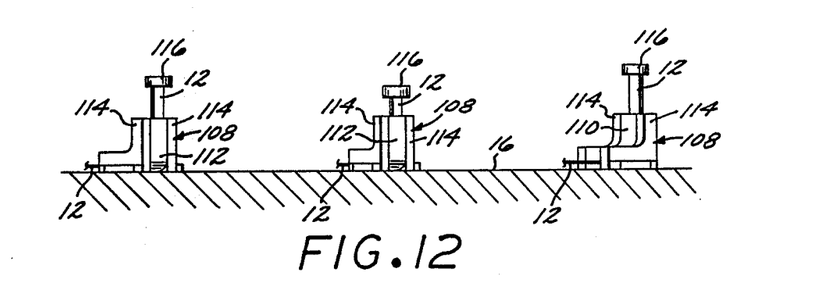
FIG. 12 is an enlarged view taken along the line 12—12 of FIG. 11.
Figure 13:
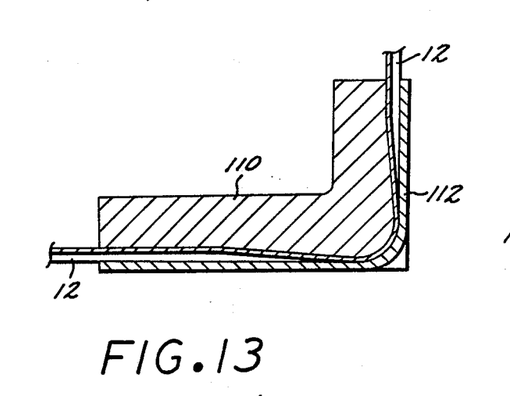
FIG. 13 is an enlarged view taken along the line 13—13 of FIG. 11.

With reference to the drawing figures, each modified transporter 108 is slidable over the work surface and comprises a pair of L-shaped members 110 and 112 which define a generally L-shaped passage having a horizontal portion receiving the tape 12, a vertical portion for projecting the tape upwardly, and a curvilinear intermediate portion which is sufficiently narrow that the curvilinear tape tends to be flattened during its transition from horizontal to vertical. This develops a frictional constraint on the tape. The level of this constraint or friction is greater than the friction between the transporter 108 and the work surface 16 over which the transporter is slidable.

The amount of frictional constraint can be increased or decreased by any suitable means, such as by tightening or loosening fastening means (not shown) which pass through a pair of vertically oriented side plates 114 on either side of the members 110 and 112. Tightening of the fastening means clamps the plates 114 against the edges of the tape.

Figure 11:
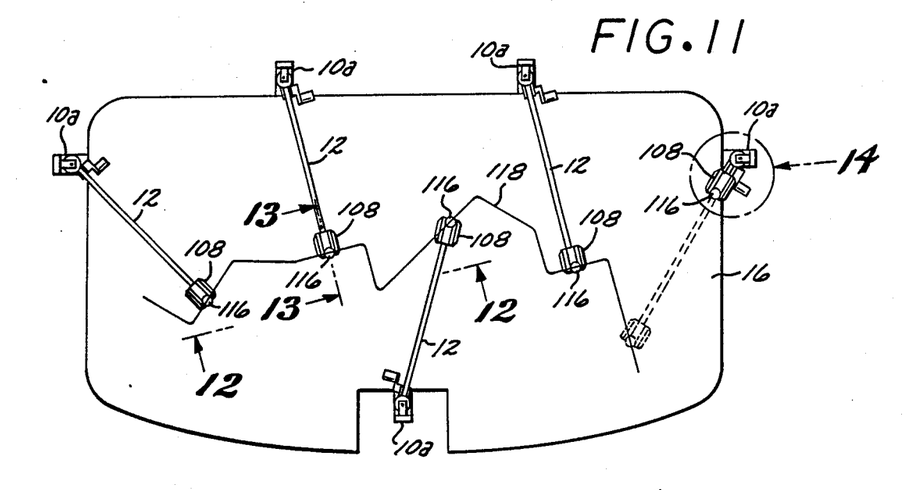
FIG. 11 is a plan view of a second embodiment of the apparatus, and in which each transporter is movable independently of the others and incorporates a tape driven support.

A tube support 116 forms part of each transporter and is fixed to the upper or free end of the tape 12 in position to support a section of bent tubing 118, as seen in FIG. 11.

The positioner 10a of the second embodiment is substantially identical to the positioner 10 of the first embodiment except as will next be discussed.

Figure 14:
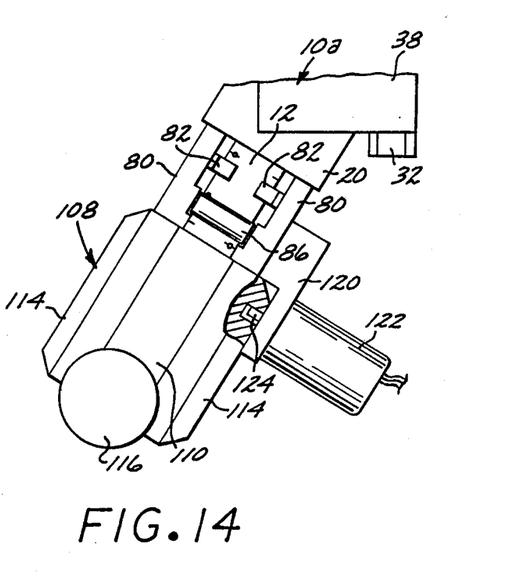
FIG. 14 is an enlarged top plan view of the area designated by the numeral 14 in FIG. 11.

As best seen in FIG. 14, the positioner 10a includes a bracket 120 secured to one of the sensor guides 80. The bracket 120 mounts a solenoid 122 which is energizable to retract a locking pin 124 from a complemental recess provided in the adjacent transporter side plate 114. With the solenoid de-energized the extended pin 124 locks the transporter 108 to the positioner 10a so that actuation of the tape drive will be ineffective to extend or retract the transporter. Instead, as will be seen, such actuation will either rotate the transporter through an azimuth angle, or raise the tube support 116 to adjust the Z coordinate.

More particularly, the embodiment of the present apparatus thus far described for moving the transporter 14 to desired X-Y coordinates can be relatively simply modified by the addition of certain components to suit the apparatus for the positioning of the tube support 116. As best seen in FIG. 3, a standard electromagnetic friction clutch and brake 126 is located adjacent the upper extremity of the motor drive shaft 62. A similar clutch and brake 128 is mounted adjacent the lower extremity of the axle stub 41.

The clutch and brake 126 and 128 can be of any type which is suitable to stop or hold the armature and load to which it is attached. One suitable form of this mechanism is manufactured by Rockford Dynatorq, available through Motion Control Products of Rolling Hills Estates, California.

The clutch and brake 126 comprises an external frame 130 associated with an energizable coil and field, and an armature disk 132. The armature disk 132 is fixed to the upper end of the motor drive shaft 62, while the frame 130 is fixedly attached to the upper surface of the work platform top plate 34.

The drive shaft 62 extends upwardly through the frame 130, and is freely rotatable relative to the frame, but upon energization of the coil of the clutch and brake, the rotation of the armature disk 132 relative to the frame 130 is stopped and rotation of the drive shaft 62 no longer takes place relative to the work platform 34.

Likewise, the clutch and brake 128 includes a frame 134 fixedly attached to the underside of the work platform base 30, and an armature disk 136 fixed to the lower extremity of the axle stub 41. The stub 41 is freely rotatable within the central opening of the frame 134 but, upon energization of the clutch and brake coil, rotation of the armature disk 136 relative to the frame 134 is halted and no further rotation of the stub shaft 41 can occur relative to the work platform.

As previously indicated, the stator portion of the drive motor 20 is fixed to the frame of the motor, while the armature, generally designated at 138, is rotatable with the motor drive shaft 62.

With this arrangement, and assuming the mounting body 38 is constrained against azimuthal or pivotal movement by energization of the clutch and brake 128, and further assuming that the solenoid 122 is de-energized so that the transporter is locked against movement away from the mounting body of the positioner, operation of the drive motor rotor in the proper direction will force the tape 12 to overcome the frictional constraint of the passage in the transporter. The tube support 116 will then be raised by the tape to the proper height or Z coordinate. Feedback signals from the encoder associated with the drive motor signal achievement of the proper height, and the control system terminates further tape movement. During this operation, the clutch and brake 126 is de-energized to permit free rotation of the rotor drive shaft 62 relative to the work platform 28.

Assuming now that the clutch and brake 126 is energized to fix the drive shaft 62 against rotation, and assuming that the clutch and brake 128 is de-energized, actuation of the drive motor will cause its torque to be transmitted to the motor stator. This will result in rotation of the upper extremity of the motor structure at the pivot bearing 71 and at a pivot bearing 140 which is mounted in the work platform base 30, and rotatably receives the stub shaft 41. The transporter 108 will then rotate in azimuth relative to the mounting body of the positioner 10a, as best seen in FIG. 14.

Appropriate and timed energization of the clutch and brakes 126 and 128 and solenoid 122 are accomplished by the central control system in a preferred sequence to establish the support 116 at the desired X, Y and Z coordinates.

In operation, clutch and brake 126 and solenoid 122 are de-energized, and clutch and brake 128 are energized. The drive motor is next operated in a direction to draw in the tape 12 until no more motion is detected by the optical sensors 83. Next, clutch and brake 126 is energized and clutch and brake 128 and solenoid 122 are de-energized. The torque of the drive motor is imparted to the motor stator and as a consequence the mounting body and the transporter 108 locked to it will be rotated.

The polarity of energization of the motor is slected to rotate the transporter in a direction which will bring it up against adjacent structure of the mounting body of the positioner 10a. Any suitable form of rotational stop (not shown) can be provided on the positioner 10a to engage the transporter at this time. When no further motion is detected by the encoder 22, the transporter is then in a predetermined position, that is, at a known angle. The movement of the transporter relative to the positioner 10a will result in slight outward movement of the tape.

The tape 12 is now preferably fed out a short distance at what is termed a staging length, in the order of eight inches. This is done by de-energizing the clutch and brake 126 and the solenoid 122 and energizing the clutch and brake 128. Operation of the drive motor in the proper direction will effect rotation of the pinch roller 45 and protect the tape the desired distance.

The next step is to rotate the transporter 108 from its known angular position to a desired azimuth angle. This is done by de-energizing the clutch and brake 128 and the solenoid 122, and energizing the clutch and brake 126. Operation of the drive motor causes the drive torque to be imparted to the stator, rotating the mounting body 38, the transporter 108 and the short length of intervening tape. Since the tape will retract somewhat during this step, the tape is fed in completely by next de-energizing clutch and brake 126 and solenoid 122, and energizing clutch and brake 128, and operating the drive motor in the proper direction until no motion is detected by the sensors 83.

Next, the solenoid 122 and clutch and brake 128 are energized, the clutch and brake 126 is de-energized, and the drive motor operated in response to the control signals from the control system to raise the the support 116 to the proper Z coordinate or height.

Finally, the tape is fed out to the desired distance to establish the proper X, Y coordinates by de-energizing the clutch and brake 126 and solenoid 122, energizing the clutch and brake 128, and operating the drive motor in a direction which will project the tape.

When all the transporters and their associated supports are properly located, as seen in FIG. 11, the X, Y and Z coordinates constituting the zero deflection points are established, and the tubing 118 to be inspected is placed upon the supports.

From the foregoing it will be appreciated that the unique tape drive system of the present apparatus enable rapid location of a transporter at desired X and Y coordinates and, with certain modifications to the apparatus, also enables a support associated with the transporter be raised and lowered to establish Z coordinate.

While several forms of the invention have been illustrated and described, it will be apparent that various modifications can be made without departing from the scope and spirit of the invention.

I claim:

1. In apparatus for positioning an article at particular X, Y plot coordinates of a work surface, one or more positioners coupled to the article and responsive to control means operative to generate control signals corresponding to the X, Y plot coordinates, each positioner comprising:
   a work platform adapted to be fixed relative to the work surface;
   a mounting body pivotally carried by the work platform for rotation in an arc about an axis perpendicular to the work surface;
   tape drive means carried by the mounting body and having a drive shaft rotatable in response to control signals from the control means;
   a tape spool rotatably carried by the mounting body;
   an elongated tape wound upon the tape spool, coupled to the tape drive means, and connected at one end to the article, the tape having tape indicia at predetermined intervals along its length, and further having sufficient stiffness to resist bending under compressive loads applied by the tape drive means whereby operation of the tape drive means in one direction pulls upon the tape, and in the opposite direction pushes upon the tape, thereby to pull or push the article over the work surface; and
   tape movement sensor means fixed relative to the tape and cooperative with the tape indicia as the tape indicia moves past the tape movement sensor means to provide feedback signals to the control means corresponding to longitudinal movement of the tape relative to the mounting body.

2. Apparatus according to claim 1 wherein the tape drive means comprises pinch roller means including a pair of pinch rollers rotatably carried by the mounting body and adapted to receive the tape between them, the tape drive means being operative to rotate the pinch rollers.

3. Apparatus according to claim 1 wherein the drive means includes a drive motor having a drive shaft, and including tape drive sensor means cooperative with the drive shaft to provide feedback signals to the control means corresponding to angular movement of the drive shaft relative to the mounting body.

4. In apparatus for positioning an article at particular X, Y plot coordinates of a work surface, one or more positioners coupled to the article and responsive to control means operative to generate control signals corresponding to the X, Y plot coordinates, each positioner comprising:
   a work platform adapted to be fixed relative to the work surface;
   a mounting body pivotally carried by the work platform for rotation in an arc about an axis perpendicular to the work surface;
   pinch roller means including a pair of pinch rollers rotatably carried by the mounting body;
   a tape spool rotatably carried by the mounting body;
   an elongated tape wound upon the tape spool, extending between the pinch rollers, and connected at one end to the article, the tape having tape indicia at predetermined intervals along its length, and further having sufficient stiffness to resist bending under compressive loads applied by the pinch rollers whereby rotation of the pinch rollers in one direction pulls upon the tape, and in the opposite direction pushes upon the tape, thereby to pull and push the article over the work surface;
   a drive motor carried by the mounting body and including a drive shaft coupled to the pinch roller means, the drive motor being responsive to control signals from the control means to rotate the pinch rollers;
   tape drive sensor means cooperative with the drive motor to provide feedback signals to the control means corresponding to angular movement of the drive shaft relative to the mounting body; and
   tape movement sensor means fixed relative to the tape and cooperative with the tape indicia as the tape indicia moves past the tape movement sensor means to provide feedback signals to the control means corresponding to longitudinal movement of the tape relative to the mounting body.

5. Apparatus according to claim 4 wherein the mounting body is freely pivotable about an axis perpendicular to the work surface whereby the mounting body is movable conformable to angular movements of the outer extremity of the tape by other agencies.

6. Apparatus according to claim 4 wherein the mounting body is pivotable about an axis perpendicular to the work surface only upon overcoming a predetermined level of frictional constraint and including means actuable to prevent rotation of the pinch rollers, and wherein operation of the drive motor develops a torque in excess of the level of frictional constraint to rotate the mounting body relative to the work platform when the pinch rollers are prevented from rotating.

7. In apparatus for positioning a transporter at particular X, Y and Z plot coordinates of a work surface, a positioner coupled to the transporter and responsive to control means operative to generate control signals corresponding to the X, Y and Z plot coordinates, the positioner comprising:
   a work platform adapted to be fixed relative to the work surface;
   a mounting body pivotally carried by the work platform for rotation in an arc about an axis perpendicular to the work surface;

tape drive means carried by the mounting body and operative in response to control signals from the control means;

a tape spool rotatably carried by the mounting body;

an elongated tape wound upon the tape spool, coupled to the tape drive means, and extending to the transporter, the outer extremity of the tape being supported by the transporter for vertical movement upwardly of the transporter, the tape having tape indicia along its length and sufficient stiffness to resist bending under compressive loads applied by the tape drive means whereby operation of the tape drive means in one direction pulls upon the tape, and in the opposite direction pushes upon the tape, thereby to pull or push the transporter over the work surface; and a support carried by the transporter and attached to the outer end of the tape whereby when the transporter is constrained against movement relative to the work surface, the tape is adapted to be pushed and moved upwardly of the transporter to raise the support to the Z coordinate.

8. Apparatus according to claim 7 wherein the transporter imposes a predetermined level of constraint against movement of the tape upwardly of the transporter, and the level of such constraint is greater than the level of any constraint against movement of the transporter by the tape over the work surface.

9. Apparatus according to claim 7 wherein the positioner and transporter include means operative in response to control signals from the control means to fix the transporter to the positioner and thereby constrain the transporter against movement relative to the work surface.

10. In apparatus for positioning a transporter at particular X, Y and Z plot coordinates of a work surface, a positioner coupled to the transporter and responsive to control means operative to generate control signals corresponding to the X, Y and Z plot coordinates, the positioner comprising:

a work platform adapted to be fixed relative to the work surface;

a drive motor having a rotor portion and a stator portion and operative in response to control signals from the control means;

a mounting body fixed to the stator portion and pivotally carried by the work platform for rotation in an arc about an axis perpendicular to the work surface;

tape drive means carried by the mounting body and coupled to the rotor portion for operation of the tape drive means;

first means electrically energizable in response to control signals from the control means to fix the transporter to the work platform and thereby constrain the transporter against movement relative to the work surface;

second means electrically energizable in response to control signals from the control means to fix the stator portion relative to the work platform and thereby constrain the mounting body against rotation relative to the work platform whereby the torque of the drive motor rotates the rotor portion and operates the tape drive means;

third means electrically energizable in response to control signals from the control means to fix the rotor portion relative to the work platform and thereby constrain operation of the tape drive means by the rotor portion whereby the torque of the drive motor rotates the stator portion and the mounting body;

an elongated tape coupled to the tape drive means and extending to the transporter, the outer extremity of the tape being supported by the transporter for vertical movement upwardly of the transporter, the tape having tape indicia along its length and sufficient stiffness to resist bending under compressive loads applied by the tape drive means whereby operation of the tape drive means in one direction pulls upon the tape, and in the opposite direction pushes upon the tape, thereby to pull or push the transporter over the work surface; and a support carried by the transporter and attached to the outer end of the tape whereby when the transporter is constrained against movement relative to the work surface, the tape is adapted to be pushed and moved upwardly of the transporter to raise the support to the Z coordinate.

11. Apparatus according to claim 10 wherein the transporter imposes a predetermined level of constraint against movement of the tape upwardly of the transporter, and the level of such constraint is greater than the level of any constraint against movement of the transporter by the tape over the work surface.

* * * * *